(12) United States Patent
Herron et al.

(10) Patent No.: US 6,807,219 B2
(45) Date of Patent: Oct. 19, 2004

(54) LASER HOUSING HAVING INTEGRAL MOUNTS AND METHOD OF MANUFACTURING SAME

(75) Inventors: Michael Alan Herron, Overland Park, KS (US); Brian Keith Brickeen, Wentzville, MO (US)

(73) Assignee: Honeywell Federal Manufacturing & Technologies, Kansas City, MO (US)

( * ) Notice: Subject to any disclaimer, the term of this patent is extended or adjusted under 35 U.S.C. 154(b) by 163 days.

(21) Appl. No.: 10/302,266

(22) Filed: Nov. 21, 2002

(65) Prior Publication Data

US 2004/0101017 A1 May 27, 2004

(51) Int. Cl.[7] ................................................ H01S 3/08
(52) U.S. Cl. ...................................... 372/107; 372/109
(58) Field of Search ................................. 372/107, 109

(56) References Cited

U.S. PATENT DOCUMENTS

| | | | |
|---|---|---|---|
| 4,079,404 A | 3/1978 | Comerford et al. ......... 357/119 |
| 4,731,795 A | * 3/1988 | Clark et al. ................. 372/107 |
| 5,268,066 A | 12/1993 | Tabasky et al. ............. 156/633 |
| 5,561,684 A | * 10/1996 | Martin ....................... 372/107 |
| 6,085,978 A | 7/2000 | Knowles et al. ....... 235/462.01 |
| 6,122,307 A | 9/2000 | Koseki ....................... 372/107 |
| 6,156,219 A | 12/2000 | Shimoji ....................... 216/24 |
| 6,172,997 B1 | 1/2001 | Miyake et al. ................ 372/36 |

* cited by examiner

Primary Examiner—Don Wong
Assistant Examiner—Leith A Al-Nazer
(74) Attorney, Agent, or Firm—Hovey Williams LLP

(57) ABSTRACT

A housing adapted to position, support, and facilitate aligning various components, including an optical path assembly, of a laser. In a preferred embodiment, the housing is constructed from a single piece of material and broadly comprises one or more through-holes; one or more cavities; and one or more integral mounts, wherein the through-holes and the cavities cooperate to define the integral mounts. Securement holes machined into the integral mounts facilitate securing components within the integral mounts using set screws, adhesive, or a combination thereof. In a preferred method of making the housing, the through-holes and cavities are first machined into the single piece of material, with at least some of the remaining material forming the integral mounts.

17 Claims, 4 Drawing Sheets

LASER HOUSING HAVING INTEGRAL MOUNTS AND METHOD OF MANUFACTURING SAME

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to laser housings, baseplates, optic mounts, and other laser component support structures, and methods of making the same. More particularly, the present invention concerns a laser housing machined from a single piece of material to have a substantial degree of integral support structure, including mounts for optical and other components, thereby reducing the total number of components, allowing for lower production tolerances and faster production times, and making the laser substantially more rugged and robust.

2. Description of the Prior Art

In a laser, particularly in an optical assembly portion of the laser, it is necessary to position, support, and align various optical and other components so as to achieve a desired operating performance. Typically, a housing is provided having an exterior and a substantially empty and unobstructed interior within which mounts are positioned and secured for receiving the components. These mounts are discrete structures constructed separately from the housing and then secured, using a mechanical fastener, chemical adhesive, or other suitable mechanism, to the housing. Commonly, for example, precision holes are drilled for each mount, and screws or pins are used to secure the mount to the housing.

Unfortunately, these prior art lasers suffer from a number of problems and disadvantages, including, for example, that the screwed or pinned mounts can become loose or shift, particularly when exposed to vibration. Thus, they are typically not sufficiently or satisfactorily rugged or robust for some applications, particularly those involving rough handling. Furthermore, the screws or pins are typically constructed from materials that expand or contract when subjected to temperature changes. This can cause cracking or other failure in the mount. Furthermore, manufacturing tolerances for the relatively large number of separately manufactured parts must be relatively high so that, once assembled, the tolerances cannot add or otherwise combine to result in the laser being out of alignment or otherwise unusable. Unfortunately, the relatively large number of separately manufactured parts, each having to be machined to a high tolerance, results in increased production costs. Additionally, installing all of the screws or pins or other fasteners for securing the mounts substantially increases production time.

Due to the above-identified and other problems and disadvantages in the art, a need exists for an improved laser housing and component mounting mechanism.

SUMMARY OF THE INVENTION

The present invention overcomes the above-described and other problems and disadvantages in the prior art with an improved housing adapted to position, support, and facilitate aligning various components, including an optical path assembly, of a laser. In a preferred embodiment, the housing is constructed from a single piece of material and broadly comprises one or more through-holes; one or more cavities; and one or more integral mounts.

The through-holes are high-precision holes extending through the material. High precision is desired because the through-holes cooperate with at least some of the cavities to define the integral mounts. The cavities result from removal of portions of an interior area of the material, and substantially intersect at least one of the through-holes. Some of the cavities are created to facilitate access to the through-hole, while other cavities are adapted to receive and retain one or more of the laser components (e.g., a pump module; a polarizer; a pentaprism; and a Q-switch).

After the through-holes and the cavities have been machined, at least some of the material remaining in the interior area forms the integral mounts. One or more securement holes are machined into a top or other surface of at least some of the integral mounts for receiving securement mechanisms for securing the component in the mount. For example, one of the securement holes may be internally threaded for receiving a set screw for temporarily securing the component, while another securement hole may provide a conduit for introducing an epoxy adhesive between the mount and the component for permanently securing the component. In this example, the set screw can be removed after the epoxy adhesive has cured.

Thus, it will be appreciated that the present invention provides a number of substantial advantages over the prior art, including, for example, integrating the mounts directly into the material of the housing itself, thereby reducing the total number of parts, decreasing production times and costs, and resulting in a more rugged and robust laser that is easier and quicker to align. Furthermore, the internal screws, washers, and precision pins required in the prior art to secure its discrete mounts are eliminated in the present invention, resulting in faster assembly. Additionally, removing the screws, washers, and precision pins advantageously avoids cracking or other failure that might otherwise occur due to expansion or contraction as a result of temperature changes. Additionally, stacking or combining of tolerances is eliminated, allowing for faster and easier alignment. Thus, a laser using the housing of the present invention may have half the number of parts of an otherwise similar prior art laser, and production costs may be as low as one-third that of the prior art laser, making mass production of lasers more practical and affordable.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
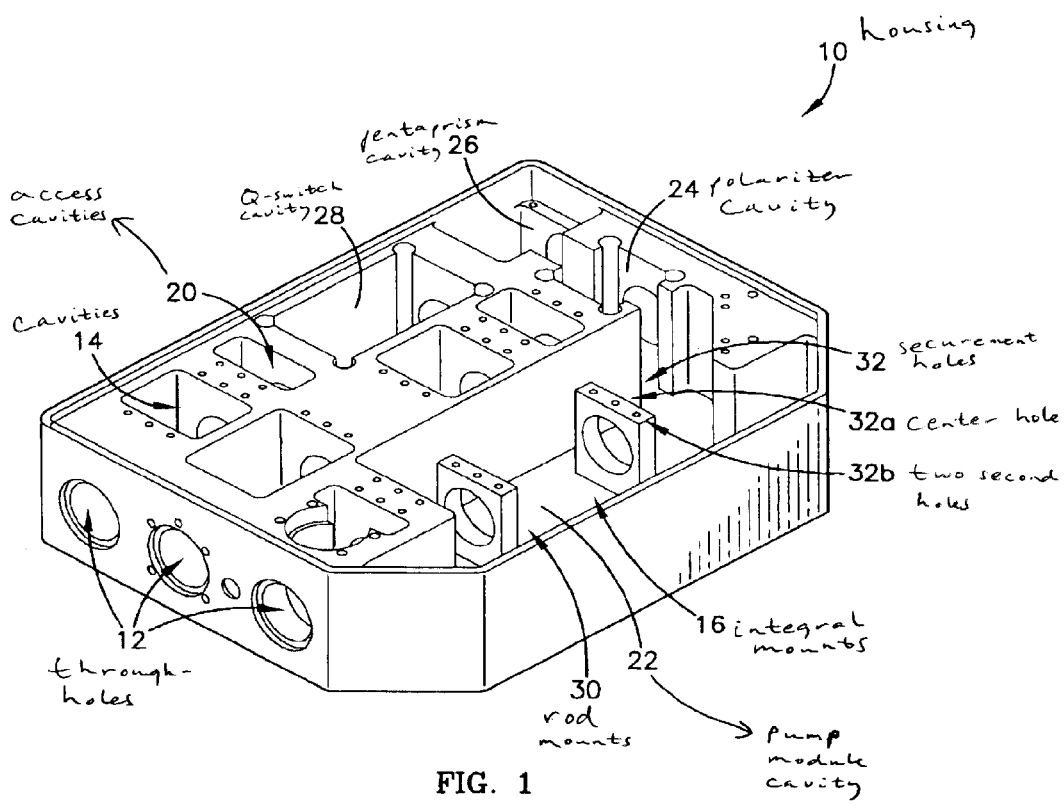
FIG. 1 is an isometric view of a preferred first embodiment of the laser housing of the present invention.
Figure 2:
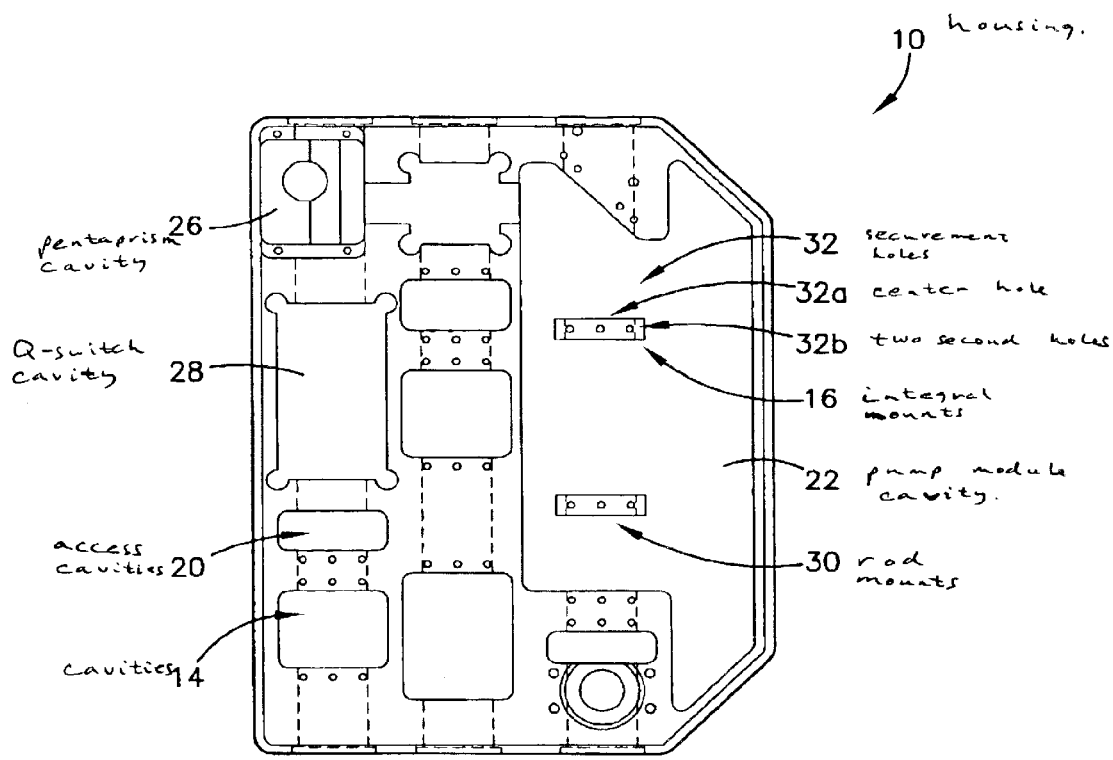
FIG. 2 is a plan view of the laser housing of FIG. 1.
Figure 3:
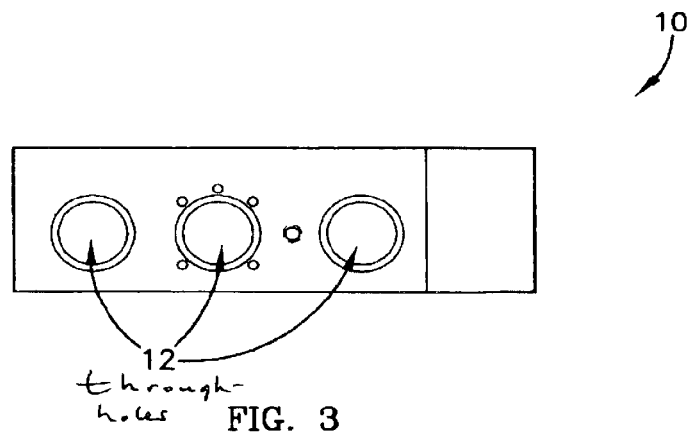
FIG. 3 is a front elevation view of the laser housing of FIG. 1.

Referring to FIGS. 1–3, a laser housing 10 is shown constructed in accordance with a preferred embodiment of the present invention. The housing 10 is adapted to position, support, and facilitate aligning various components, including an optical path assembly, of a laser. Though described herein as being specifically adapted for a low profile solid state laser implementation, the housing 10 is not limited thereto and is instead readily adapted for use in substantially any type of laser.

In the illustrated preferred embodiment, the housing 10 broadly comprises one or more through-holes 12; one or more cavities 14; and one or more integral mounts 16. The housing 10 may be constructed from a single piece or block of any suitable material, such as, for example, steel or aluminum.

The through-holes 12 are high-precision holes extending through the material. High precision is desired because the through-holes 12 cooperate with at least some of the cavities 14 to define the integral mounts 16, as described below. Because the integral mounts 16 are substantially immovable and therefore cannot be moved or shimmed to compensate for an imprecise alignment of the components, the through-holes must be sufficiently precise so as to avoid such a gross misalignment. Thus, the through-holes 12 must be machined with high precision to a minimum alignment tolerance. In the illustrated embodiment, being of a laser having a folded optical path, there are three through-holes 12, each being oriented substantially parallel to the others.

The cavities 14 result from the strategic removal of portions of an interior area of the material. Each of the cavities 14 substantially intersects one of the through-holes 12. Some of the cavities 14 are access cavities 20 that provide only access to a corresponding through-hole 12, thereby facilitating the placement of one or more of the components in the through-hole 12. These access cavities 20 will appear empty after final assembly of the laser. Other cavities 14 are adapted to receive and retain one or more of the components. In the illustrated embodiment, for example, this latter type of cavity 14 includes a pump module cavity 22, a polarizer cavity 24, a pentaprism cavity 26, and a Q-switch cavity 28, each being adapted to receive and retain a corresponding component.

After the through-holes 12 and the cavities 14 have been machined, at least some of the material remaining in the interior area forms the integral mounts 16. In the illustrated embodiment, for example, two rod mounts 30 are provided in the pump module cavity 22. The rod mounts 30 project upwardly from a floor of the housing 10 and are defined by one of the through holes 12 passing through material remaining in the pump module cavity 22 after machining.

One or more securement holes 32 are machined into a top or other surface of at least some of the integral mounts 16, including the aforementioned rod mounts 30, for receiving securement mechanisms for securing the component in the mount 16. As illustrated, for example, each mount 16 is provided with three such holes 32, including a center hole 32a and two second holes 32b. The center hole 32a is tapped to receive a set screw for temporarily securing the component in the mount 16. The two second holes 32b allow for injecting epoxy or another adhesive or bonding agent to permanently secure the component in its proper position. The set screw may be removed once the epoxy has cured.

Figure 4:
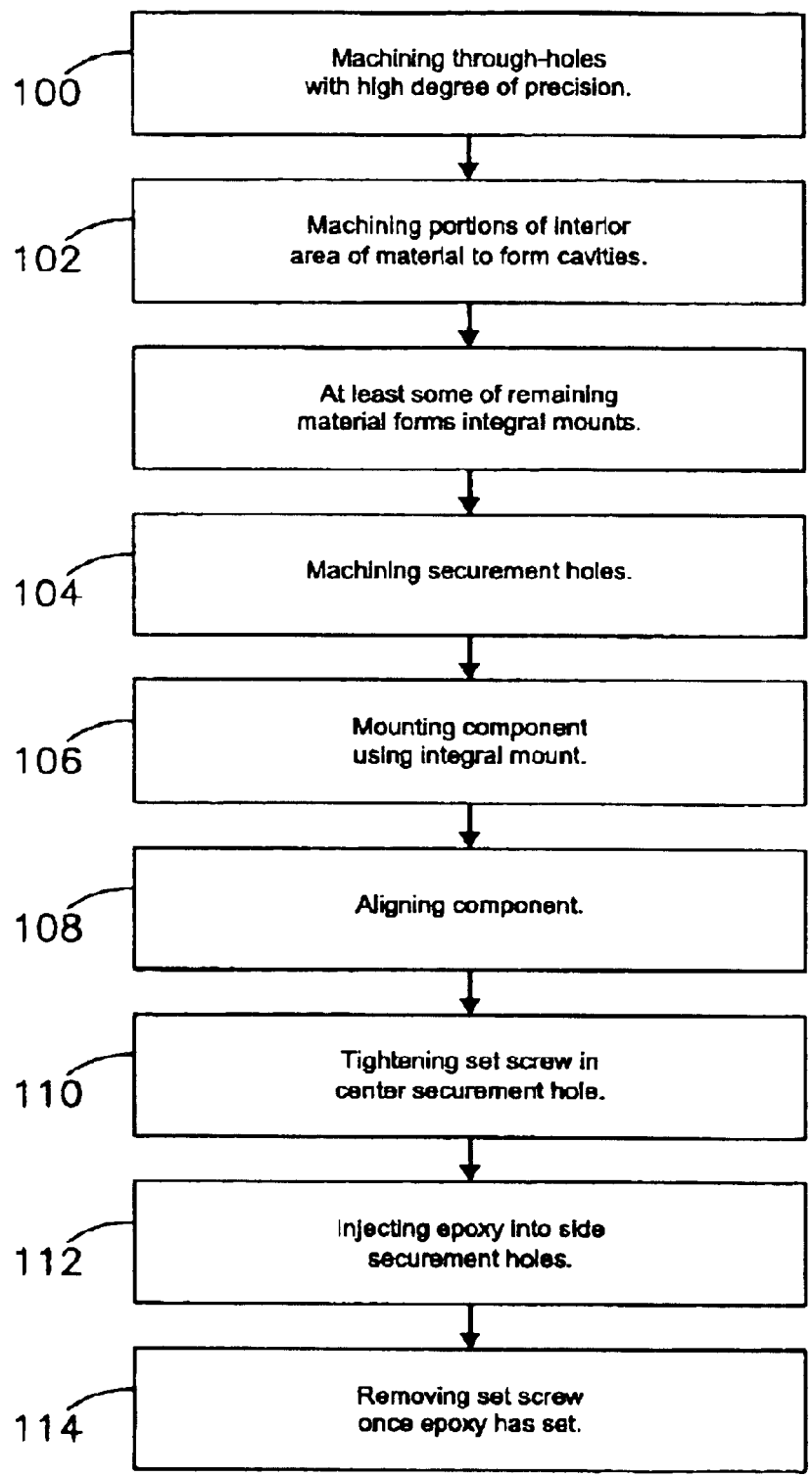
FIG. 4 is a flowchart of a preferred method of manufacturing the laser housing of FIG. 1.

Referring also to FIG. 4, the housing 10 is constructed as follows. First, the through-holes 12 are drilled, bored, cut, or otherwise machined into the material with the aforementioned high degree of precision, as depicted in box 100. Next, portions of the interior area of the material are cut, machined, or otherwise removed to form the cavities 14, as depicted in box 102, such that each cavity 14 substantially intersects one or more of the through-holes 12. At least some of the material remaining in the interior area forms the integral mounts 16. Then the securement holes 32 are drilled, bored, or otherwise machined into the top or other surface of at least some of the integral mounts 16, as depicted in box 104.

Thereafter, a component can be mounted by placing it within one of the integral mounts 16, as depicted in box 106; aligning the component, as depicted in box 108; inserting and tightening the set screw in the center securement hole 32a, as depicted in box 110; and injecting epoxy into both side securement holes 32b, as depicted in box 112. Once the epoxy has set, the set screw can be removed, as depicted in box 114.

Figure 5:
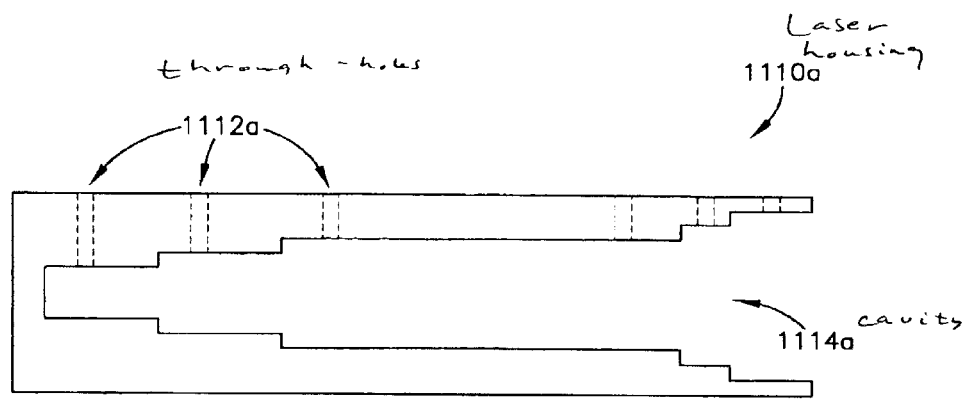
FIG. 5 is a plan view of a first configuration of a preferred second embodiment of the laser housing of the present invention.
Figure 6:
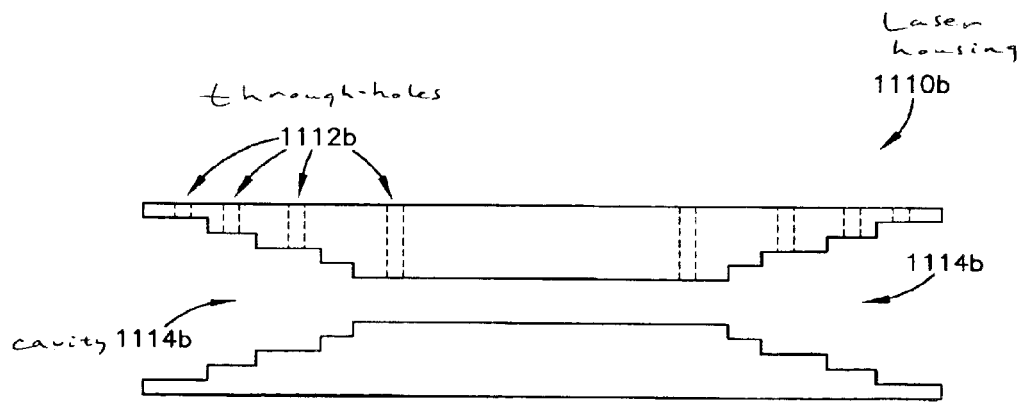
FIG. 6 is a plan view of a second configuration of the preferred second embodiment of the laser housing of the present invention.
Figure 1:
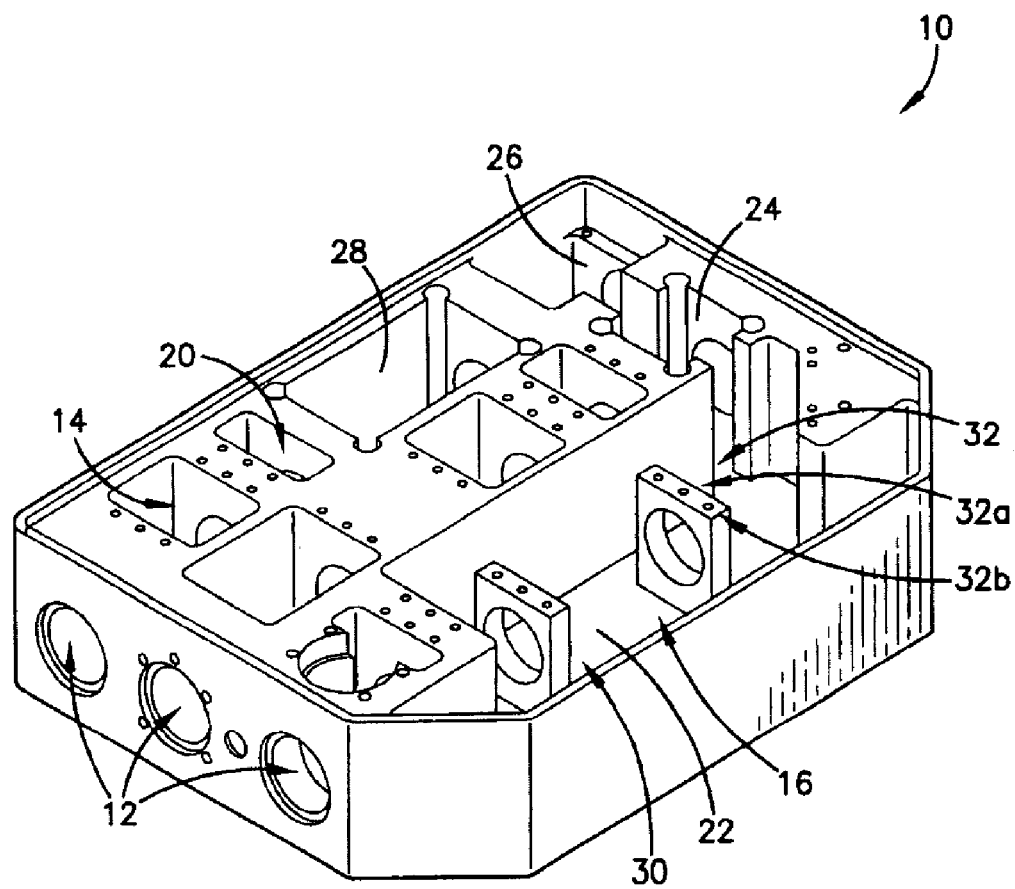
Figure 2:
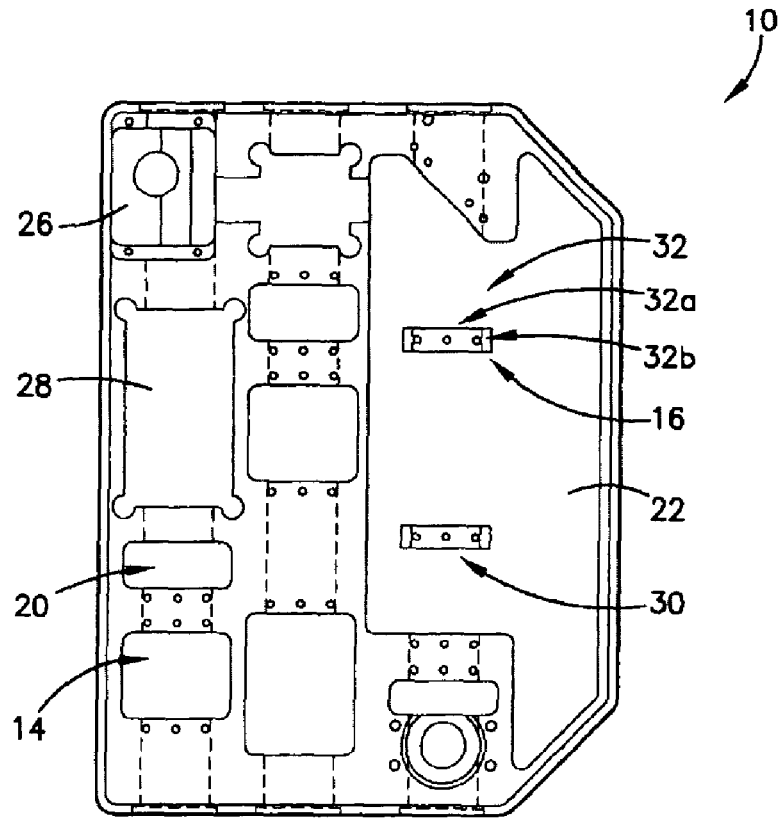
Figure 3:
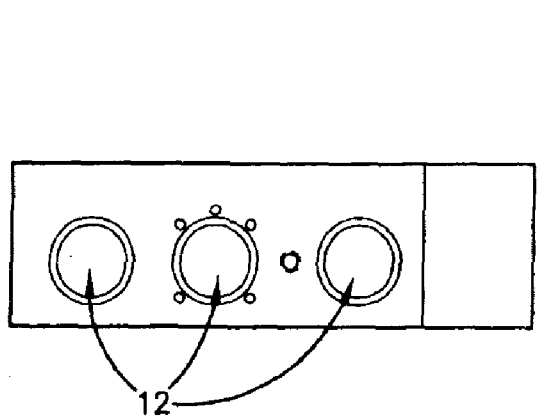
Figure 4:
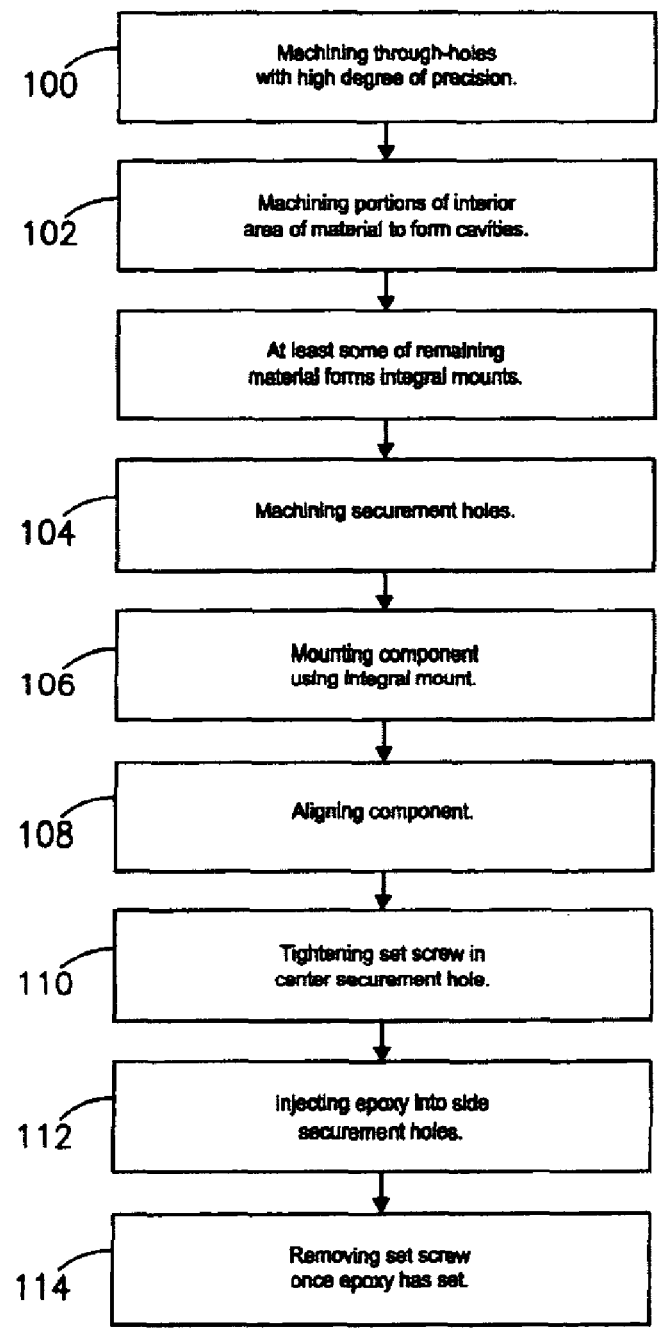
Figure 5:
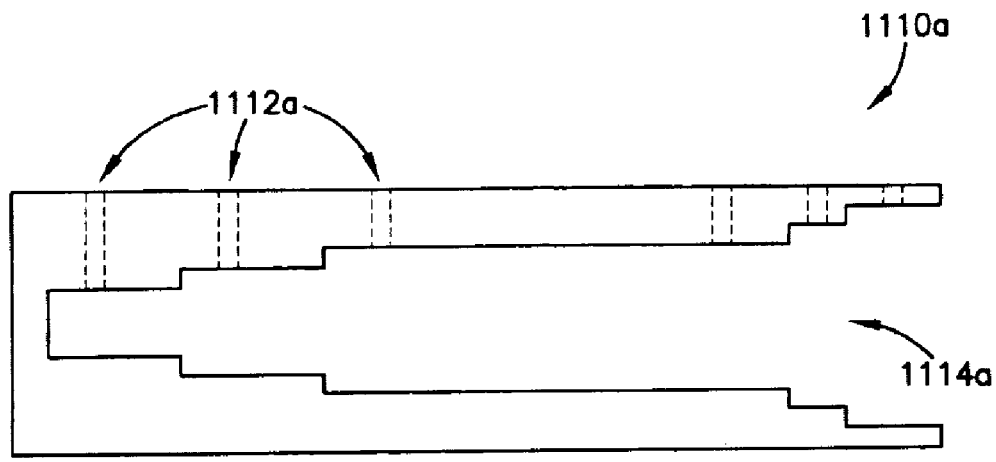
Figure 6:
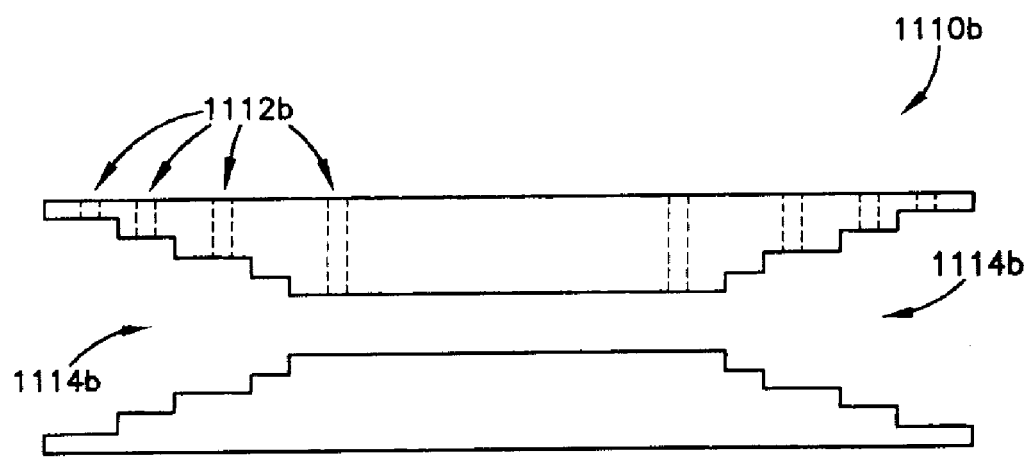

Referring to FIGS. 5 and 6, first and second configurations, respectively, of a preferred second embodiment of the laser housing 1110a, 1110b are shown as being substantially similar to the above-described first embodiment but for the following differences. Specifically, the second embodiment illustrates an alternative implementation of the cavities 1114a,1114b, wherein the cavities 1114a, 1114b are formed by machining a series of concentric, counter-bored holes from one end (FIG. 5) or both ends (FIG. 6) of the material. The deepest of the cavity holes 1114a,1114b intersects all of the through-holes 1112a,1112b, while successively less deep cavity holes 1114a,1114b intersect successively fewer through-holes 1112a,1112b. Each cavity hole 1114a,1114b cooperates with a respective one of the through-holes 1112a,1112b to form a component mount, and the various components of the laser are installed within the cavity holes 1114a,1114b in order of depth. Thus, for applications where this implementation is appropriate, the cavity holes 1114a,1114b can potentially be formed more efficiently than is the case in the above-described first embodiment.

From the preceding description, it will be appreciated that the housing 10 of the present invention provides a number of substantial advantages over the prior art, including, for example, integrating the mounts 16 directly into the material of the housing 10 itself, thereby reducing the total number of parts, decreasing production times and costs, and resulting in a more rugged and robust laser that is easier and quicker to align. Furthermore, the internal screws, washers, and precision pins required in the prior art to secure discrete mounts are eliminated in the present invention, resulting in faster assembly. Additionally, removing the screws, washers, and precision pins advantageously avoids cracking or other failure that might otherwise occur due to expansion or contraction as a result of temperature changes. Additionally, there is less stacking or combining of tolerances, allowing for faster and easier alignment. Thus, a laser using the housing 10 of the present invention may have half the number of parts of an otherwise similar prior art laser, and production costs may be as low as one-third that of the prior art laser, making mass production of high-power solid state lasers more practical and affordable. In one implementation, for example, a laser using the housing 10 of the present invention requires only seventeen individually machined parts, while a similar prior art laser requires thirty-six such parts. Furthermore, using the housing 10 of the present invention, only two of the parts required more than two hours of processing time, while fifteen of the parts of the prior art laser required more than two hours of processing time.

Although the invention has been described with reference to the preferred embodiments illustrated in the attached drawings, it is noted that equivalents may be employed and substitutions made herein without departing from the scope of the invention as recited in the claims. It will be appreciated, for example, that, though described and shown herein as being particularly adapted for a flatpack solid state laser implementation, the housing is readily adapted for use in other types of lasers as well. Furthermore, the present invention does not preclude including one or more discrete, separately manufactured mounts in the housing such that both integral and discrete mounts are used. Additionally, though referred to herein as a "housing", the present invention should not be interpreted to require a complete enclosure. The housing may, for example, take the form of a substantially open embodiment for bench top use or for incorporation into a larger laser enclosure.

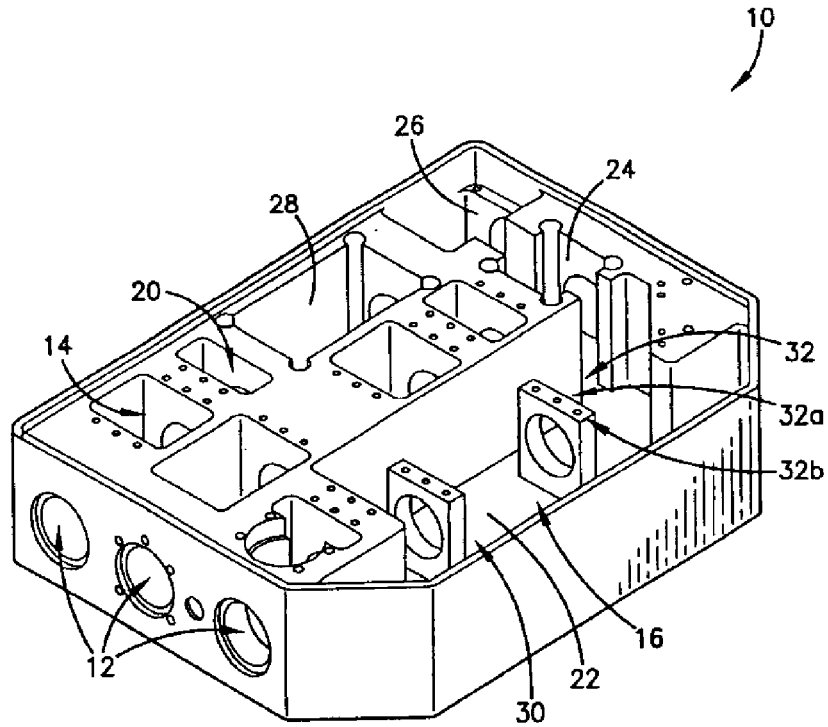

Having thus described the preferred embodiment of the invention, what is claimed as new and desired to be protected by Letters Patent includes the following:

1. A housing for a laser, wherein the housing is machined from a single piece of material, the housing comprising:
    a through-hole machined into the single piece material;
    at least one cavity machined into the single piece of material so as to substantially intersect the through-hole; and
    at least one component mount substantially defined by the through-hole and the cavity, wherein the component mount has a surface, there being a securement hole machined into the surface for receiving a securement mechanism for securing a component in the component mount.

2. The housing as set forth in claim 1, wherein the through-hole is machined with high precision to a minimum alignment tolerance.

3. The housing as set forth in claim 1, wherein there at least two cavities, including a first cavity and a second cavity, with the first cavity being adapted to facilitate inserting a first component into the through-hole, and the second cavity being adapted to receive and retain a second component in close association with the through-hole.

4. The housing as set forth in claim 1, wherein the securement hole is internally threaded to receive a threaded set screw for securing the component.

5. The housing as set forth in claim 1, wherein the securement hole is a conduit for facilitating introduction of an adhesive between the component and the component mount.

6. The housing as set forth in claim 1, wherein the laser has a folded optical path, and there being at least two through-holes machined into the single piece of material to accommodate the folded optical path.

7. A housing for a laser, wherein the housing is machined from a single piece of material, the housing comprising:
    a through-hole machined into the single piece material, wherein the through-hole is machined with high precision to a minimum alignment tolerance;
    a first cavity machined into the single piece of material so as to substantially intersect the through-hole, and adapted to facilitate inserting a first component into the through-hole,
    a second cavity machined into the single piece of material so as to substantially intersect the through-hole, and adapted to receive and retain a second component in close association with the through-hole; and
    at least one component mount substantially defined by the through-hole and the first cavity, wherein the component mount has a surface, there being a first internally-threaded securement hole machined into the surface for receiving an externally-threaded set screw for securing a component in the component mount, and a second securement hole providing a conduit for facilitating introduction of an adhesive between the component and the component mount to thereby further secure the component therein.

8. The housing as set forth in claim 7, wherein the laser has a folded optical path, and there being at least two through-holes machined into the single piece of material to accommodate the folded optical path.

9. A method of creating a housing for a laser, wherein the housing is machined from a single piece of material, the method comprising the steps of:
    (a) machining one or more through-holes into the single piece of material;
    (b) machining a first cavity and a second cavity into the single piece of material such that each of the first cavity and the second cavity substantially intersects at least one of the one or more through-holes and such that the first cavity cooperates with the at least one through-hole to define a component mount;
    (c) inserting a first component through the first cavity and into the component mount;
    (d) securing the first component in the component mount;
    (e) inserting a second component into the second cavity; and
    (f) securing the second component in the second cavity in close association with the at least one through-hole.

10. The method as set forth in claim 9, wherein the one or more through-holes are machined with high precision to a minimum alignment tolerance so as to facilitate aligning the first component.

11. The method as set forth in claim 9, further including the steps of—
    (g) machining an internally-threaded securement hole into a surface of the component mount; and
    (h) screwing an externally-threaded set screw into the internally-threaded securement hole to secure the first component in the component mount.

12. The method as set forth in claim 9, further including the steps of—
    (g) machining a conduit securement hole into a surface of the component mount; and
    (h) injecting an adhesive into the conduit securement hole to secure the first component in the component mount.

13. The method as set forth in claim 9, further including the steps of—
    (g) machining an internally-threaded securement hole into a surface of the component mount;
    (h) screwing an externally-threaded set screw into the internally-threaded securement hole to temporarily secure the first component in the component mount;
    (i) machining a conduit securement hole into a surface of the component mount;

(j) injecting an adhesive into the conduit securement hole to permanently secure the first component in the component mount; and (k) removing the externally-threaded screw from the internally-threaded securement hole after the adhesive has cured.

14. A method of creating a housing for a laser, wherein the housing is machined from a single piece of material, the method comprising the steps of:

(a) machining one or more through-holes into the single piece of material, wherein the one or more through-holes are machined with high precision to a minimum alignment tolerance;

(b) machining a first cavity and a second cavity into the single piece of material such that each of the first cavity and the second cavity substantially intersects at least one of the one or more through-holes and such that the first cavity cooperates with the at least one through-hole to define a component mount;

(c) machining an internally-threaded securement hole into a surface of the component mount;

(d) machining a conduit securement hole into the surface of the component mount;

(e) inserting a first component through the first cavity and into the component mount;

(f) securing the first component in the component mounting by screwing an externally-threaded set screw into the internally-threaded securement hole to temporarily secure the first component, and injecting an adhesive into the second conduit securement hole to permanently secure the first component;

(g) removing the set screw once the adhesive has cured;

(h) inserting a second component into the second cavity; and (i) securing the second component in the second cavity in close association with the through-hole.

15. A method of creating a housing for a laser, wherein the housing is machined from a single piece of material, the method comprising the steps of:

(a) machining a first through-hole and a second through-hole into the single piece of material;

(b) machining a first cavity in the form of a first hole in the single piece of material such that the first cavity substantially intersects both the first through-hole and the second through-hole;

(c) machining a second cavity in the form of a second hole which is concentric with the first hole, such that the second cavity substantially intersects the second through-hole;

(d) inserting and installing a first component in the first cavity; and (e) inserting and installing a second component in the second cavity.

16. The method as set forth in claim 15, wherein the first and second through-holes are machined with high precision to a minimum alignment tolerance so as to facilitate aligning the first and second components.

17. The method as set forth in claim 15, wherein the first cavity cooperates with the first through-hole to form a component mount, and further including the steps of—

(f) machining an internally-threaded securement hole into a surface of the component mount; and (g) screwing an externally-threaded set screw into the internally-threaded securement hole to secure the first component in the component mount.

* * * * *

UNITED STATES PATENT AND TRADEMARK OFFICE
CERTIFICATE OF CORRECTION

PATENT NO. : 6,807,219 B2
DATED : October 19, 2004
INVENTOR(S) : Herron et al.

It is certified that error appears in the above-identified patent and that said Letters Patent is hereby corrected as shown below:

Title page illustrating a drawing figure should be deleted, and substitute therefor a title page illustrating a figure as shown on the attached sheet.

Delete drawing sheets 1-4, and substitute therefore drawing sheets 1-4. (Attached)

Signed and Sealed this

Eighteenth Day of January, 2005

JON W. DUDAS
*Director of the United States Patent and Trademark Office*

(12) United States Patent
Herron et al.

(10) Patent No.: US 6,807,219 B2
(45) Date of Patent: Oct. 19, 2004

(54) LASER HOUSING HAVING INTEGRAL MOUNTS AND METHOD OF MANUFACTURING SAME

(75) Inventors: Michael Alan Herron, Overland Park, KS (US); Brian Keith Brickeen, Wentzville, MO (US)

(73) Assignee: Honeywell Federal Manufacturing & Technologies, Kansas City, MO (US)

( * ) Notice: Subject to any disclaimer, the term of this patent is extended or adjusted under 35 U.S.C. 154(b) by 163 days.

(21) Appl. No.: 10/302,266

(22) Filed: Nov. 21, 2002

(65) Prior Publication Data
US 2004/0101017 A1 May 27, 2004

(51) Int. Cl.[7] ................................. H01S 3/08
(52) U.S. Cl. ........................... 372/107; 372/109
(58) Field of Search ....................... 372/107, 109

(56) References Cited

U.S. PATENT DOCUMENTS

| | | | |
|---|---|---|---|
| 4,079,404 A | 3/1978 | Comerford et al. | 357/119 |
| 4,731,795 A * | 3/1988 | Clark et al. | 372/107 |
| 5,268,066 A | 12/1993 | Tabasky et al. | 156/633 |
| 5,561,684 A * | 10/1996 | Martin | 372/107 |
| 6,085,978 A | 7/2000 | Knowles et al. | 235/462.01 |
| 6,122,307 A | 9/2000 | Koseki | 372/107 |
| 6,156,219 A | 12/2000 | Shimoji | 216/24 |
| 6,172,997 B1 | 1/2001 | Miyake et al. | 372/36 |

* cited by examiner

*Primary Examiner*—Don Wong
*Assistant Examiner*—Leith A Al-Nazer
(74) *Attorney, Agent, or Firm*—Hovey Williams LLP

(57) ABSTRACT

A housing adapted to position, support, and facilitate aligning various components, including an optical path assembly, of a laser. In a preferred embodiment, the housing is constructed from a single piece of material and broadly comprises one or more through-holes; one or more cavities; and one or more integral mounts, wherein the through-holes and the cavities cooperate to define the integral mounts. Securement holes machined into the integral mounts facilitate securing components within the integral mounts using set screws, adhesive, or a combination thereof. In a preferred method of making the housing, the through-holes and cavities are first machined into the single piece of material, with at least some of the remaining material forming the integral mounts.

17 Claims, 4 Drawing Sheets